Jan. 25, 1966  R. A. TYLER  3,231,239
GAS TURBINE

Filed Nov. 30, 1964  2 Sheets-Sheet 2

3,231,239
GAS TURBINE
Ronald A. Tyler, 728 Lonsdale Road, Ottawa, Ontario, Canada
Filed Nov. 30, 1964, Ser. No. 414,651
4 Claims. (Cl. 253—59)

This invention relates to improvements in gas turbines and is more particularly applicable to gas turbines of the axial flow type designed for use for traction purposes, such as for the propulsion of automobiles, locomotives, or other vehicles.

More specifically, the invention is directed towards providing a measure of dynamic braking in a gas turbine.

As is well known, among the problems presented by the application of gas turbines to automobiles has been the fact that a typical turbine presents virtually no resistance to continued rotation whenever the throttle is closed to reduce the incoming supply of gas. By contrast, whenever the driver raises his foot from the accelerator pedal in an automobile employing a conventional reciprocating piston engine, the engine provides a significant degree of dynamic braking, so that the speed of the vehicle tends to be reduced. Any equivalent braking effect is absent from a normal gas turbine, and it becomes necessary to supply the braking effect by some additional means, since this effect is one to which the motorist has grown accustomed and will expect from any automobile.

In a locomotive the reasons for desiring a similar braking action differ from those applicable to the case of an automobile. Public acceptance is no longer a consideration, but nevertheless it is useful to the engineer to have some built-in braking effect when he closes the throttle. It provides a means of reducing wear on the conventional brakes.

The object of the present invention is to provide means for achieving a braking effect in a gas turbine in a reliable and efficient manner.

The principle of the present invention and a manner in which it may be carried into practice are illustrated diagrammatically in the accompanying drawings. It is to be understood that these drawings are provided by way of example only, and not by way of limitation of the scope of the invention, which latter is defined in the appended claims.

Figure 1:
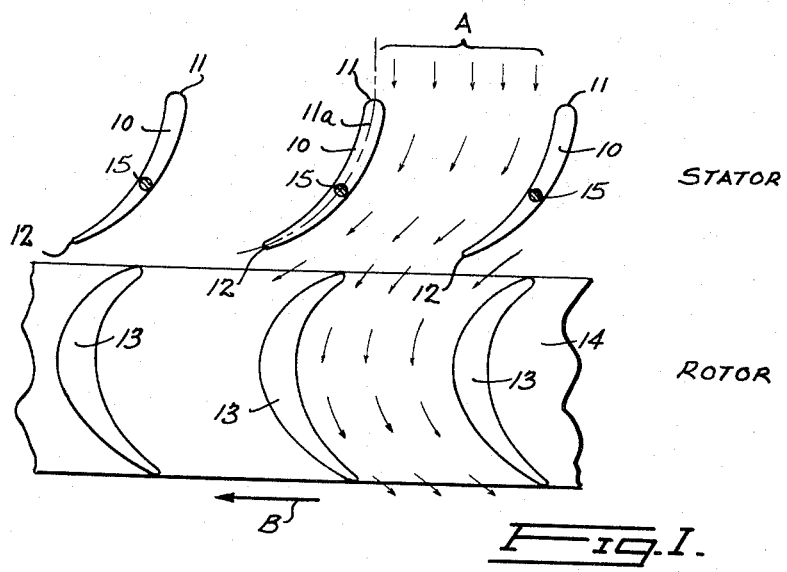
FIGURE 1 is a fragmentary diagram developed on a flat surface illustrating a few typical blades of the stator and rotor of an axial flow gas turbine, showing the blades in their normal positions.

FIGURE 1 shows a series of stator blades 10 having concave surfaces and leading edges 11 facing edge-on into the oncoming gas flow as shown by the arrows A. By "edge-on" it is meant that the centre line 11a of the blade at the edge 11 is substantially parallel to the direction of gas flow, which in the present example is assumed to be axial. From the trailing edges 12 of the blades 10 the deflected gas flow is directed onto concave surfaces of blades 13 of a rotor 14 and serves to rotate the latter in the direction from right to left as shown by arrow B in FIGURE 1. It will be appreciated that FIGURE 1 shows merely a few of the many blades that will be employed on both the stator and the rotor and that these will in reality be arranged in the usual circular configuration common in axial flow turbines.

The tubirne blade configuration, as so far described in connection with FIGURE 1, is conventional. The novel feature of the present invention is to mount the stator blades 10 on spindles 15 and then to rotate these blades from the drive position of FIGURE 1 to the brake position shown in FIGURE 2, the normally trailing edges 12 of the stator blades now facing directly edge-on into the oncoming gas stream. As appears from FIGURE 2, the effect of this rotation of the stator blades 10 is to cause the gas to impinge on the rear, convex surfaces 16 of the rotor blades 13 and consequently to tend to check forward movement of the rotor. The direction of the circumferential component of velocity imparted to the gas has thus been reversed. As can be observed from a comparison of FIGURES 1 and 2, the blades 10 are rotated through an angle of approximately 120° in the clockwise direction, when they are moved to the brake position. It should also be observed that the orientation of the blades 10 in the brake position is eminently satisfactory from the viewpoint of efficiency of airflow. The former trailing edges 12, which have now become the leading edges, face directly edge-on into the gas stream A, which is the optimum condition for minimization of flow losses. At the same time, the gas stream is deflected by the now trailing edges 11 of the blades 10 in a direction opposed to the direction of rotation of the rotor blades 13, a condition which is also desirable for the attainment of a significant braking effect.

Figure 2:
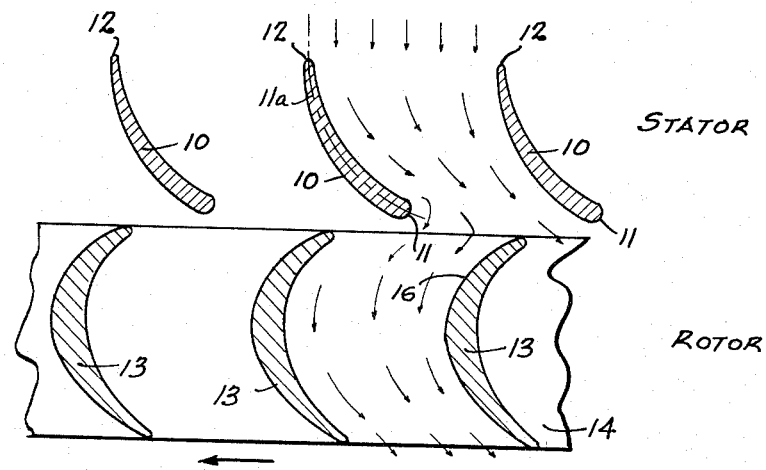
FIGURE 2 is a diagram similar to FIGURE 1 showing the stator blades turned to braking position.
Figure 3:
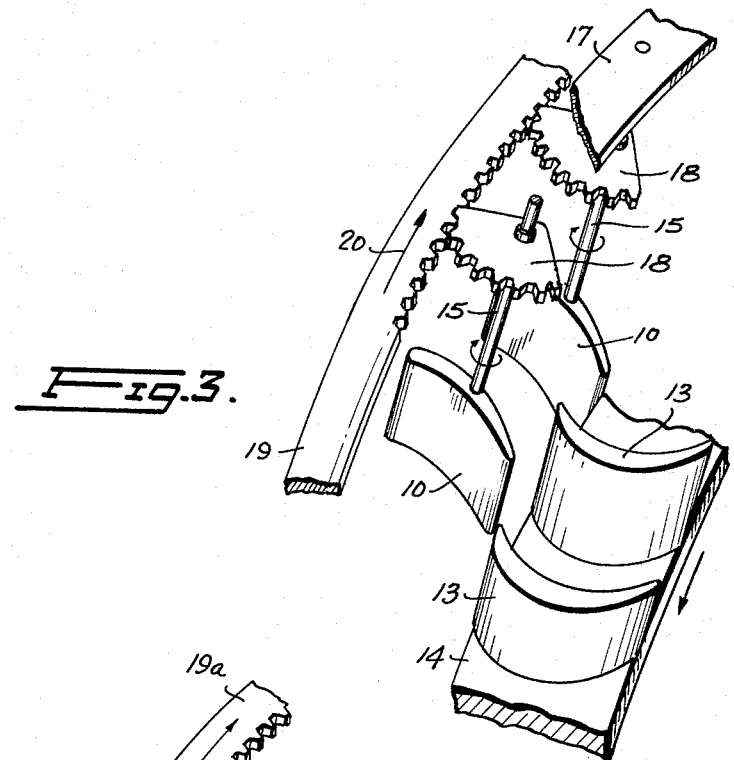
FIGURE 3 is a fragmentary view of a few blades illustrating one manner of operation of the stator blades.

One manner in which the stator blades 10 may be mounted and controlled for this rotation is illustrated diagrammatically in FIGURE 3. Each blade is mounted on a spindle 15 which is freely pivotally supported in an outer circular frame member 17 which forms part of the fixed structure of the turbine. To each spindle 15 there is secured a toothed segment 18 which meshes with a circular ring gear 19 which is mounted for rotation within the turbine casing about the major axis thereof, that is to say, the axis of rotation of the rotor 14. Whenever it is desired that a braking action be exerted, the ring gear 19 is rotated in the direction indicated by the arrow 20 to rotate the individual blades 10 to the FIGURE 2 position. The ring gear 19 can be rotated by any suitable control mechanism which can be connected to the throttle and/or independently operated as desired.

Figure 4:
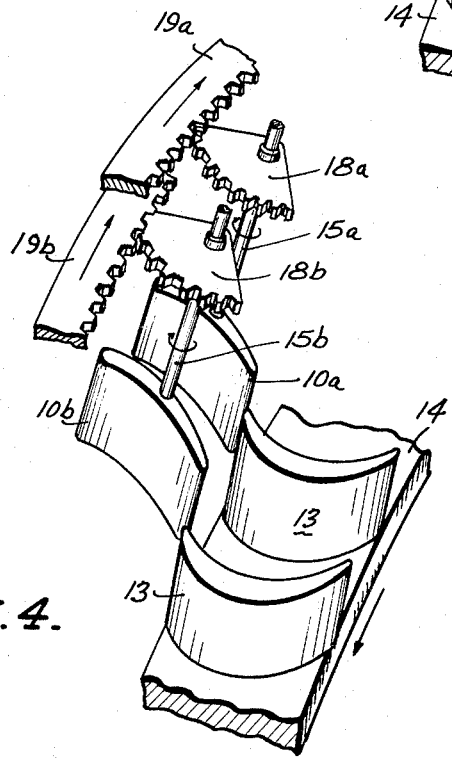
FIGURE 4 is a view similar to FIGURE 3 illustrating an alternative construction.

It will be observed that the stator blades 10 shown in FIGURES 1 and 2 are spaced apart sufficiently to enable them to be rotated simultaneously between the two positions. In the event that other considerations in the design of the turbine call for a closer spacing of the stator blades, or, in the event that it is considered preferable not to rotate the blades simultaneously so as never, even instantaneously, to close off the gas passage almost completely, the stator blades may be rotated in some kind of sequential order. For example, the blades 10 may be divided alternately into two sets, with each set separately controlled in the manner shown in FIGURE 4 where blade 10a is mounted on spindle 15a carrying segment 18a and controlled by ring gear 19a, while stator blade 10b is mounted on spindle 15b controlled by segment 18b meshing with ring gear 19b. The stator will consist of blades 10a, 10b, 10a, 10b, and so on, in alternate arrangement. When it is desired to operate the turbine to the braking position, first one of the ring gears and then the other can be turned. In this way, each alternate blade is turned, while the intermediate blades remain in their original positions. This arrangement provides more clearance between the blades as they are turned and thus allows them to be placed closer together.

It will be appreciated that, while the present arrangement is particularly useful for obtaining dynamic braking, it can be employed for unidirectional static braking when the rotor is stationary, or even for rotation of the rotor at relatively slow speed in the reverse direction.

It is desirable for efficiency of normal running that the leading edges 11 of the stator blades 10 be comparatively blunt and that the trailing edges 12 be somewhat sharper. Since the trailing edges 12 become the leading edges in the brake position of FIGURE 2, it may be desirable to thicken the trailing edges 12 somewhat, in comparison to the thickness that they would ideally have for maximum performance during normal operation, and the blade shapes shown in the drawings have in fact been modified in this respect in order to enhance their performance in the brake position.

I claim:
1. In a gas turbine
   (a) a rotor having a series of blades each having a concave and a convex surface,
   (b) and a stator structure comprising
      (i) a series of stator blades each having a concave surface extending between a pair of edges,
      (ii) means mounting each of said stator blades in a drive position in which each blade presents a first one of said edges edge-on to incoming gas and the concave surface of each blade imparts to said gas a velocity component in a first circumferential direction to discharge said gas from its second edge onto the concave surfaces of the rotor blades for rotation of the rotor in said first direction,
      (iii) and means for rotating said stator blades from said drive position to a brake position in which each blade presents its second said edge substantially edge-on to the incoming gas and the concave surface of each blade imparts to said gas a velocity component in the other circumferential direction to discharge said gas from its first edge onto the convex surfaces of the rotor blades for urging of the rotor in said other direction.

2. The gas turbine of claim 1, wherein said means for rotating said stator blades comprises means for rotating all said stator blades simultaneously.

3. The gas turbine of claim 1, wherein said means for rotating said stator blades comprises means for rotating said stator blades sequentially.

4. The gas turbine of claim 1, wherein said means for rotating said stator blades comprises means dividing said blades alternately into two sets, means for rotating all the blades of the first set simultantously, and means for rotating all the blades of the second set simultaneously and independently of the first set.

References Cited by the Examiner
UNITED STATES PATENTS

| | | | |
|---|---|---|---|
| 2,337,861 | 12/1943 | Adamchik | 230—114 |
| 2,689,680 | 9/1954 | Lovesey | 230—114 |
| 2,805,818 | 9/1957 | Ferri | 253—78 |
| 2,819,732 | 1/1958 | Paetz | 253—78 |
| 2,862,687 | 12/1958 | Aguet et al. | 253—59 |
| 2,988,327 | 6/1961 | Trowbridge et al. | 253—59 |
| 3,044,262 | 7/1962 | Chadwick et al. | 253—59 |

MARK NEWMAN, *Primary Examiner.*
JULIUS E. WEST, *Examiner.*